No. 755,238. PATENTED MAR. 22, 1904.
H. C. PEAKE & J. R. ENGLISH.
MACHINERY FOR CUTTING COAL OR OTHER MINERALS.
APPLICATION FILED OCT. 21, 1902.
NO MODEL.
5 SHEETS—SHEET 1.
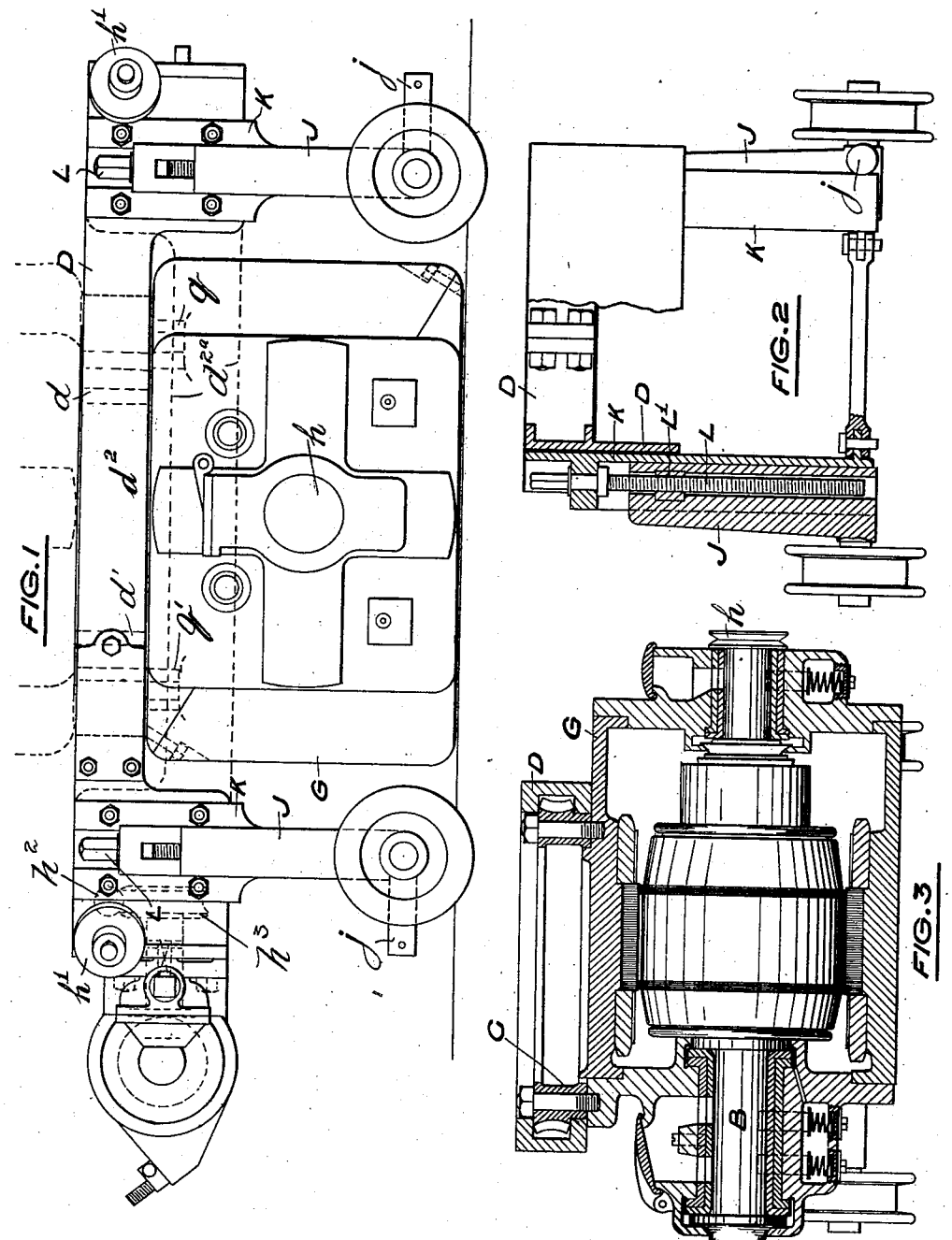
WITNESSES
INVENTORS
Henry Corpson Peake
John Robert English
By 
ATTORNEYS.

No. 755,238. PATENTED MAR. 22, 1904.
H. C. PEAKE & J. R. ENGLISH.
MACHINERY FOR CUTTING COAL OR OTHER MINERALS.
APPLICATION FILED OCT. 21, 1902.
NO MODEL. 5 SHEETS—SHEET 2.
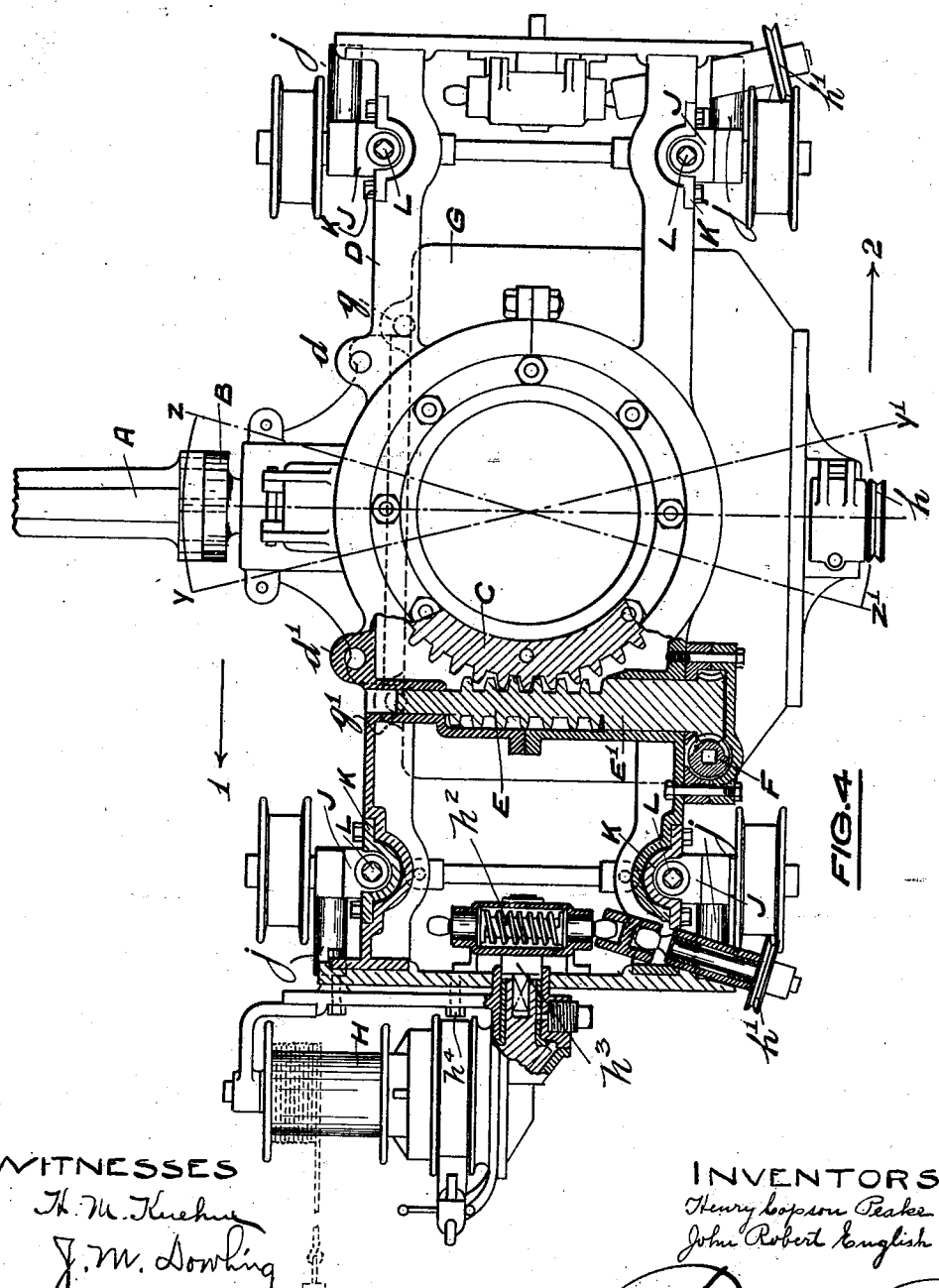
FIG. 4.
WITNESSES
INVENTORS
Henry Copson Peake
John Robert English
By 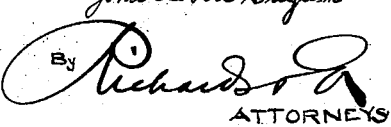
ATTORNEYS No. 755,238. PATENTED MAR. 22, 1904.
H. C. PEAKE & J. R. ENGLISH.
MACHINERY FOR CUTTING COAL OR OTHER MINERALS.
APPLICATION FILED OCT. 21, 1902.
NO MODEL. 5 SHEETS—SHEET 3.
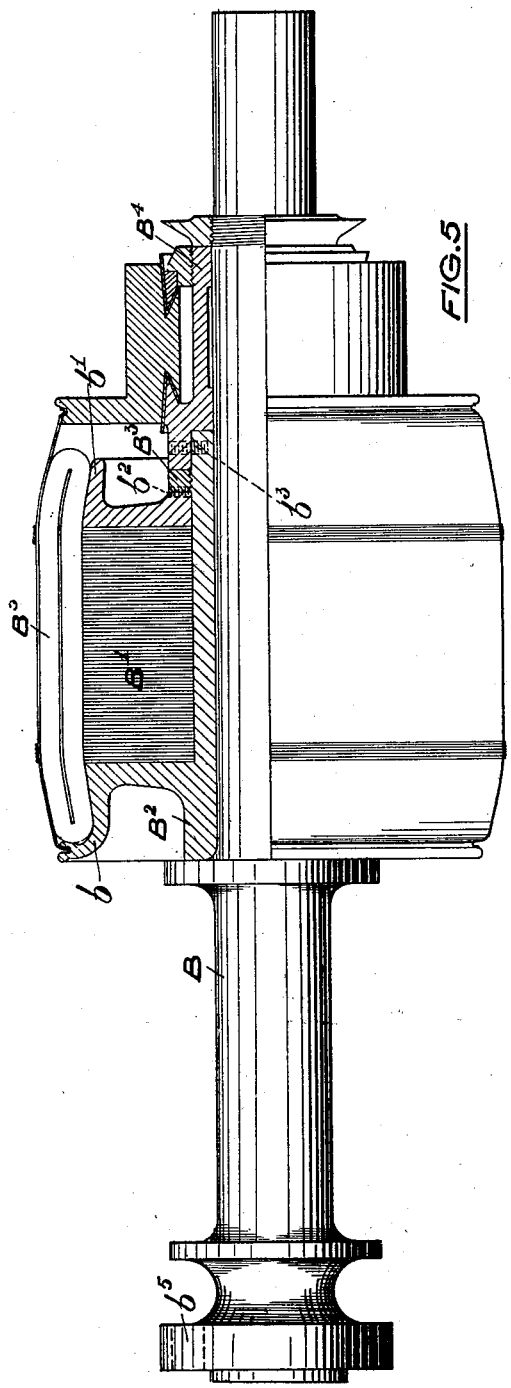
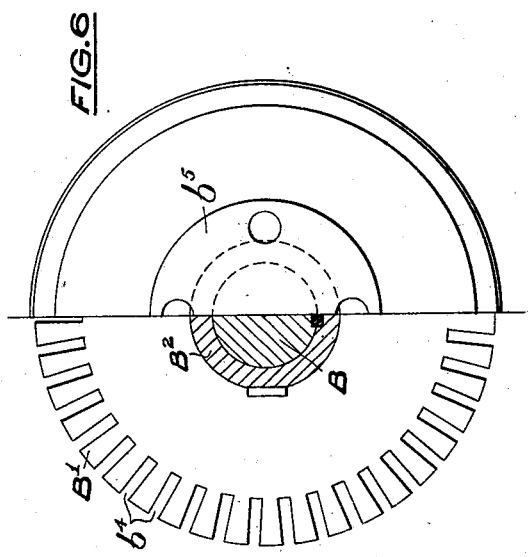
WITNESSES
INVENTORS
Henry Copson Peake
John Robert English
By Richardson
ATTORNEYS

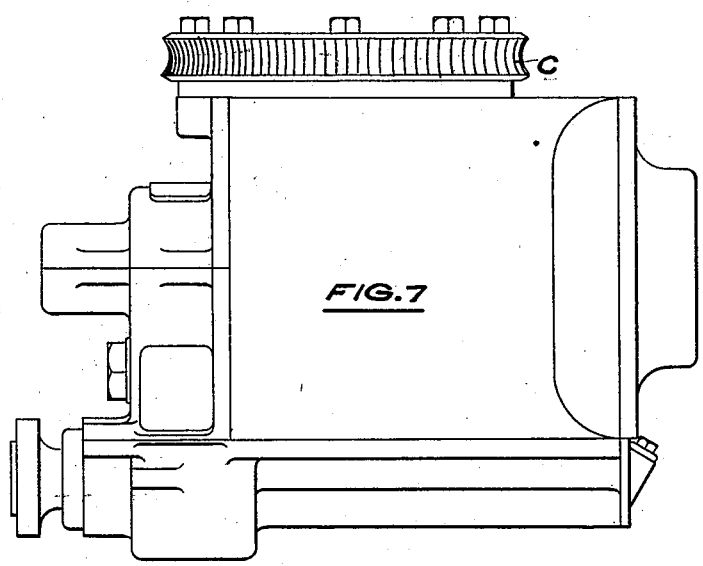
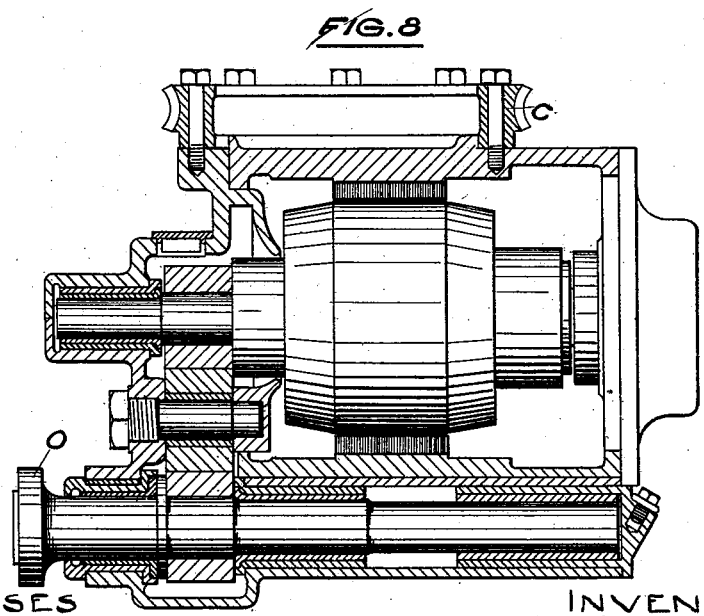

No. 755,238. PATENTED MAR. 22, 1904.
H. C. PEAKE & J. R. ENGLISH.
MACHINERY FOR CUTTING COAL OR OTHER MINERALS.
APPLICATION FILED OCT. 21, 1902.
NO MODEL. 5 SHEETS—SHEET 5.
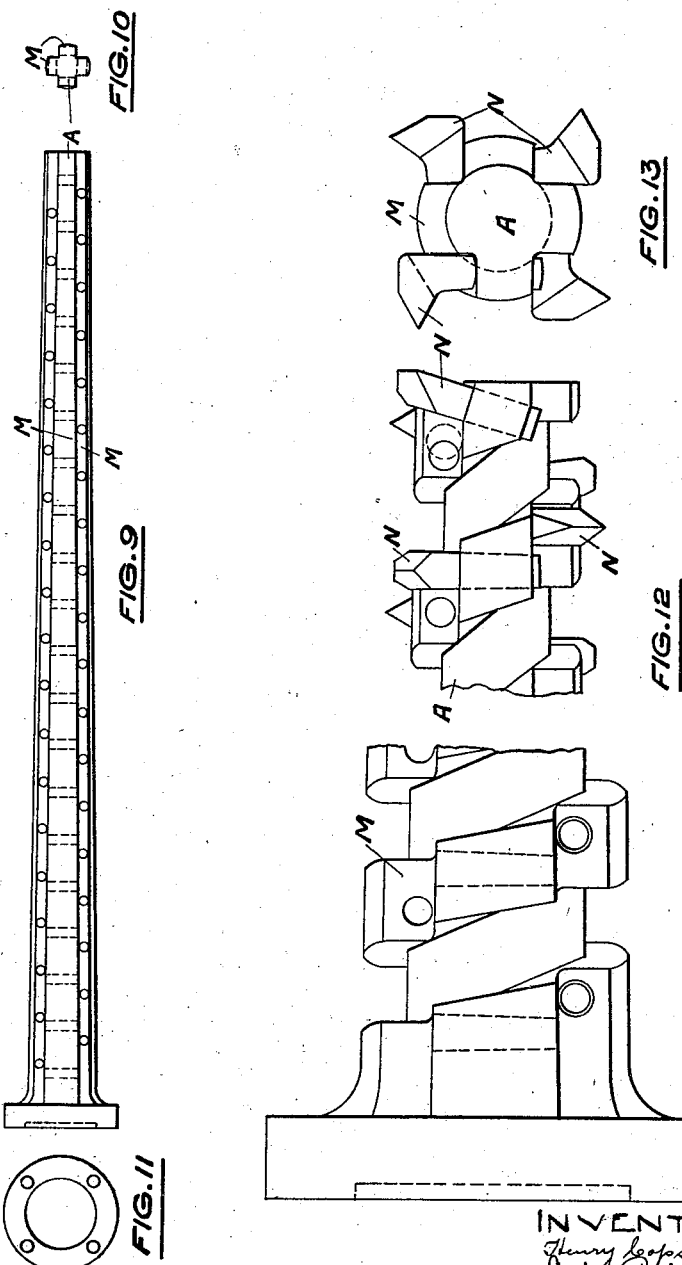
WITNESSES
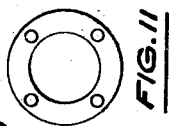
INVENTORS
ATTORNEYS No. 755,238. Patented March 22, 1904.

UNITED STATES PATENT OFFICE.

HENRY COPSON PEAKE AND JOHN ROBERT ENGLISH, OF WALSALL WOOD, NEAR WALSALL, ENGLAND.

MACHINERY FOR CUTTING COAL OR OTHER MINERALS.

SPECIFICATION forming part of Letters Patent No. 755,238, dated March 22, 1904.

Application filed October 21, 1902. Serial No. 128,118. (No model.)

*To all whom it may concern:*

Be it known that we, HENRY COPSON PEAKE and JOHN ROBERT ENGLISH, subjects of the King of Great Britain and Ireland, and residents of The Walsall Wood Colliery, Walsall Wood, near Walsall, in the county of Stafford, England, have invented certain new and useful Improvements Relating to Machinery for Cutting Coal or other Minerals, (for which we have filed an application in Great Britain, No. 7,980, bearing date April 5, 1902,) of which the following is a specification.

This invention relates to machinery for cutting coal and other minerals, and particularly to electric coal-cutting machines of the bar type, our object being to so construct and arrange the cutters as to render them more effective and durable in service and to readily adapt them and the machine by which they are driven for working in either direction and through a complete circle.

Referring to the five accompanying sheets of explanatory drawings, Figure 1 is a side elevation of an electric coal-cutting machine comprised by a combination of parts arranged in accordance with this invention. Fig. 2 is an end view with part in section, showing the framing of the machine and the means for adjusting the same with respect to its wheel-standards. Fig. 3 is a section through the motor-casing. Fig. 4 is a plan of the machine with part in section. Fig. 5 is an elevation with part in section, showing the motor-armature and the commutator; and Fig. 6 is a part-sectional end view of the same. Fig. 7 is an end view of a modification, and Fig. 8 is a sectional end view showing the application of gearing in combination with the motor. Fig. 9 is a side elevation of the cutter-bar with the cutters removed, while Figs. 10 and 11 are elevations showing the respective ends of the said bar. Fig. 12 is an elevation, and Fig. 13 an end view, showing a modified form of cutter-bar with some of the cutters in position thereon. Figs. 5 and 6 and Figs. 12 and 13 are drawn to a larger scale than that of the other figures.

The same reference-letters in the different views indicate the same or similar parts.

The cutter-bar A is directly coupled or attached to the armature-shaft B of the motor, and the latter is mounted upon or suspended from a rotatable ring or bed C, having worm-gear teeth cut or formed around its periphery. The motor is shown suspended from the ring C at Figs. 1, 3, and 4.

The ring or bed C is supported upon the main frame D of the machine and is vertically adjustable, as hereinafter described, in relation to its rail-wheel brackets or standards.

We preferably employ a motor of the four-pole iron-clad and totally-inclosed type for continuous current. The armature, which is of the slotted-drum type, has its core-plates B' threaded on and keyed to a metal sleeve $B^2$. The said sleeve $B^2$ fits upon and is keyed to the armature-shaft B. Formed with one end of the sleeve is the flange $b$, while upon the opposite end is the loose or detachable flange $b'$. The core disks or plates B' are clamped between such flanges by means of the nut $B^3$, screwed onto the sleeve, as shown. The said nut $B^3$ is locked or secured in its service position by means of a stud or screw, as $b^2$. The flanges $b\ b'$ serve also to support the end windings. The commutator is also built up on a metal sleeve $B^4$, part of which fits over the end of the core-sleeve $B^2$ and is fixed to it by screws, as $b^3$, or otherwise. The armature-windings, as $B^5$, after being wound on formers and thoroughly insulated are arranged in slots, as $b^4$, in the core-plates B' and connected to the commutator in the ordinary manner. A flange, as $b^5$, forged solid with the armature-shaft B, is provided at the end remote from the commutator for coupling the cutter-bar A directly to the shaft. At the same end the shaft is provided with a long bearing having large collars to take up the end stress set up by the action of the cutters.

The aforesaid worm wheel or ring or bed C, upon which the motor is suspended, is arranged to gear with a worm E, formed upon a shaft E', which has worm-wheel teeth formed around one end of it to gear with another worm F, arranged for rotation, preferably by hand-power. The complete double-purchase or double-reduction worm-gearing, as aforesaid, comprises the mechanism whereby the operative part of the machine comprised by the motor and the cutter-bar can be readily traversed or turned through a complete circle.

We find that for ordinary coal-mining purposes the most effective working of the machine is obtained when the cutter is set at an angle with the transverse center line of the machine. Thus the line Z Z' indicates the position of the bar for cutting when the machine is traveling in the direction indicated by the arrow 1, and, similarly, the line Y Y' shows the cutter-bar position when the machine is traveling in the direction indicated by the arrow 2. To relieve the gearing from the jar and the stress set up during the cutting action, we preferably provide lugs or projections, as $d\, d'$ and $g\, g'$, (as shown in Figs. 1 and 4,) from the sides of the main frame D and motor-casing G, respectively, having apertures to receive (when in alinement) a locking-pin whereby the said motor-casing can be readily fixed to the frame.

The hauling-gear for traveling the complete machine along the rails on which it is supported can be arranged in various ways. One arrangement comprises a drum or barrel H, which winds a rope or chain having its remote end anchored or fixed (as indicated by the dotted lines at Fig. 4) in any ordinary manner, the rotation of the barrel being effected by a rope or chain drive from one end of the motor-shaft B. The transmitting mechanism between the motor-shaft B and the barrel H comprises a rope or chain pulley, as $h$, upon the said shaft B, a corresponding pulley $h'$ on an angle shaft or spindle, as illustrated, and a worm shaft or spindle $h^2$, Figs. 1 and 4, in connection with the said angle-shaft and engaging a worm-wheel $h^3$, Fig. 4, arranged in gear with an epicyclic or other wheel train, whereby in the well-known manner the rate of advance of the machine can be varied as desired. An angle shaft or spindle with pulley, as $h'$, thereon and worm-gearing in connection with the said angle-shaft is provided at each end of the machine, as illustrated, so that the barrel H, which, with its epicyclic or other gearing, is arranged within or upon a self-contained detachable frame, can be mounted and secured by bolts or studs, as $h^4$, at either end of the main frame D, according to the direction in which the complete machine is to be traversed.

The connection of the main frame D, on which the operative parts of the machine is mounted with the rail-wheel brackets or standards, as J, is effected by means of elevating-brackets, as K. Between each elevating-bracket and its corresponding standard is arranged a screwed stem L and a nut L'. By rotation of the screws or screwed stems L in the required direction the height of the operative part of the machine from the level of the rails can be readily varied within considerable limits. In addition to the rail-wheel axle-pin disposed in the usual position at right angles with the rails each standard J is provided with a supplementary axle-pin $j$, disposed parallel or in line with the rails for the purpose hereinafter referred to.

The cutting-tool shaft or bar, as A, Figs. 9 to 13, inclusive, has a solid central portion, with ribs or projections, as M, arranged in straight diagonal or spiral lines and separated by intervening grooves or spaces in such a manner as to very effectually back up or support the small cutters arranged within the said grooves or spaces. Figs. 9, 10, and 11 illustrate a bar with straight-line ribs, while Figs. 12 and 13 show a bar with spiral ribs. The wedge-like or tapered stem parts of the cutters N, Figs. 12 and 13, fit tightly within apertures formed transversely through the ribs or projections, as illustrated. With such a shaft or bar the cutters can be made from smaller pieces of steel and be placed very closely together without weakening the bar. A more effective cutting action can thus be obtained, and as the operative edges of the cutters are brought nearer to the center of the bar than is possible with the existing practice of inserting their stem parts radially through or within the bar less power is required to drive the tool.

A machine constructed as hereinbefore described is especially adapted for cutting coal in mines worked on what is known as the "long-wall" system; but it is also applicable for cutting other minerals and with other systems of working. When the center of the cut required in the seam is within a certain distance of the level of the rails on which the machine is mounted—say not more than twenty inches and not less than ten inches—the self-contained operative part, the motor with the attached cutter-bar, is placed beneath and suspended from the worm-ring C, hereinbefore referred to; but by inverting the ring and securing the motor and bar upon the top of the same (as indicated by the dotted lines at the upper part of Fig. 1) the machine is at once available for cutting, say, forty-four inches and thirty-four inches above the rails. Cutting between the intervening range (or from twenty to thirty-four inches above the rails) can be effected by inverting the main frame (after temporarily unbolting or releasing it for such purpose from the aforesaid elevating-brackets K) so as to bring the face $d^2$ uppermost, (and at the position shown by the dotted line $d^{2a}$, Fig. 1.) With the motor above such face $d^2$ the cutter is then available for operation within the said range.

For cutting at the rail-level or between such level and, say, ten inches above the same we employ a motor such as aforesaid, but arranged, as shown at Figs. 7 and 8, in combination with gearing disposed between the armature-shaft and the shaft O, to which the cutter-bar is attached.

The machine will cut along the face of the coal, either from left to right or from right to left, and, as hereinbefore stated, the motor, with the attached cutter-bar, can be moved round in the manner described through a complete circle, the frame and the wheel-supports remaining stationary the meanwhile, if necessary. When, however, the motor is suspended beneath the worm-ring, it is necessary to detach in turn the respective standards to permit of the traverse of the bar through a complete revolution. Such detachment is effected by unbolting or releasing the required elevating-bracket K so that both the said bracket and the standard J, connected therewith, may be bodily withdrawn from the machine; but on the detachment of a standard for the purpose of allowing the passage of the bar the machine is effectually supported by the other three standards and by the bar itself when the latter is within the coal-seam.

In starting the machine at one end of a coal-face the bar will cut its own way into the coal. Similarly, on reaching the other end of the face the bar will cut its way out. Thus no "hand-holing," as with the ordinary "long-wall" cutting machines of the bar or disk type, is required.

For the transverse advance of the machine toward a new face of coal the standards J are raised one by one (by means of the respective screws L and nuts L', hereinbefore referred to) to permit of the withdrawal of the rail-wheels from the ordinary axle-pins and the placing of the same upon the aforesaid special axle-pins j. On turning any one of the screws L in one direction the effect will be to elevate the main frame; but on turning the screw in the reverse direction the standard will be raised if the adjacent portion of the frame is prevented from descending by a temporary support, such as a short length of timber or anything available in the mine. When all four wheels have been thus changed, the complete machine can be readily moved along cross-rails suitably placed for the purpose until it is in position for cutting into and along the newly-exposed wall of coal.

Having thus described our invention, what we claim as new, and desire to secure by Letters Patent, is—

1. In machines for cutting coal and other minerals, the combination consisting of a rotatable cutter-bar, a motor connected with the said bar, a supporting-frame and a rotatable bed carrying the said cutter-bar and motor and reversible with respect to the said frame, substantially as set forth.

2. In machines for cutting coal and other minerals, the combination consisting of a rotatable cutter-bar, a motor connected with the said bar, a supporting-frame, a rotatable bed carrying the said cutter-bar and motor and reversible with respect to the said frame, standard-brackets detachably connected to the frame and wheeled standards vertically adjustable with respect to the said brackets, substantially as set forth.

3. In machines for cutting coal and other minerals, the combination consisting of a rotatable cutter-bar, a motor connected with the said bar, a rotatable bed supporting the said bar and motor, a supporting-frame for the said bed, standards detachable and adjustable with respect to the said frame, and rail-wheel axles arranged at right angles on each of the said standards, substantially as set forth.

4. In machines for cutting coal and other minerals, the combination consisting of a rotatable cutter-bar, a motor connected with the said bar, a supporting-frame, a rotatable bed carrying the said cutter-bar and motor and reversible with respect to the said frame, hauling-gear detachably connected to the said frame and hauling-gear driving mechanism at each end of the same, standard-brackets detachably connected to the frame and wheeled standards vertically adjustable with respect to the said brackets, substantially as set forth.

5. In machines for cutting coal and other minerals, the combination consisting of a rotatable cutter-bar, a motor connected with the said bar, a supporting-frame, a rotatable bed carrying the said cutter-bar and motor and reversible with respect to the said frame, hauling-gear detachably connected to the frame and hauling-gear driving mechanism at each end of the same, a pulley on the said motor, a flexible transmitter conveying power from the said pulley to the said driving mechanisms, standard-brackets detachably connected to the frame and wheeled standards vertically adjustable with respect to the said brackets, substantially as set forth.

6. In machines for cutting coal and other minerals, the combination consisting of a rotatable cutter-bar, a motor connected with the said bar, a supporting-frame, a rotatable bed carrying the said bar and motor and reversible with respect to the said frame, worm-teeth around the periphery of the said bed and turning mechanism carried on the frame and gearing with the said teeth, substantially as set forth.

7. In machines for cutting coal and other minerals, the combination consisting of a rotatable cutter-bar, a motor connected with the said bar, a supporting-frame, a rotatable bed carrying the said cutter-bar and motor and reversible with respect to the said frame, worm-teeth around the periphery of the said bed, turning mechanism carried on the frame and gearing with the said teeth, standard-brackets detachably connected to the frame and wheeled standards vertically adjustable with respect to the said brackets, substantially as set forth.

8. In machines for cutting coal and other minerals, the combination consisting of a rotatable cutter-bar, a motor connected with the said bar, a rotatable bed supporting the said bar and motor, worm-teeth around the periphery of the said bed, turning mechanism in gear with the said teeth, a supporting-frame for the said bed and turning mechanism, standards detachable and adjustable with respect to the said frame, and rail-wheel axles arranged at right angles on each of the said frames, substantially as set forth.

9. In machines for cutting coal and other minerals, the combination consisting of a rotatable cutter-bar, a motor connected with the said bar, a supporting-frame, a rotatable bed carrying the said cutter-bar and motor and reversible with respect to the said frame, worm-teeth around the periphery of the said bed, turning mechanism carried on the frame and gearing with the said teeth, hauling-gear detachably connected to the frame and hauling-gear driving mechanism at each end of the same, standard-brackets detachably connected to the frame and wheeled standards vertically adjustable with respect to the said brackets, substantially as set forth.

10. In machines for cutting coal and other minerals, the combination consisting of a rotatable cutter-bar, a motor connected with the said bar, a supporting-frame, a rotatable bed carrying the said cutter-bar and motor and reversible with respect to the said frame, worm-teeth around the periphery of the said bed, turning mechanism carried on the frame and gearing with the said teeth, hauling-gear detachably connected to the frame and hauling-gear driving mechanism at each end of the same, a pulley on the said motor, a flexible transmitter conveying power from the said pulley to the said driving mechanism, standard-brackets detachably connected to the frame and wheeled standards vertically adjustable with respect to the said brackets, substantially as set forth.

11. In machines for cutting coal and other minerals, the combination consisting of an electric motor, a cutter-bar directly connected with the armature-shaft of the said motor, a supporting-frame and a rotatable bed carrying the said motor and cutter-bar and reversible with respect to the said frame, substantially as set forth.

12. In machines for cutting coal and other minerals, the combination consisting of a motor, a rotatable cutter-bar connected with the said motor and having projecting ribs with intervening grooves or spaces, a cutter in each of the said grooves fitting within the rib at one side and abutting against the rib at the opposite side of the groove, a supporting-frame and a rotatable bed carrying the said motor cutter-bar and cutters and reversible with respect to the said frame, substantially as set forth.

In witness whereof we have hereunto set our hands in presence of two witnesses.

HENRY COPSON PEAKE.
JOHN ROBERT ENGLISH.

Witnesses:
EDWARD MARKS,
HARRY DAVIS.